(12) United States Patent
Smith et al.

(10) Patent No.: US 7,594,476 B2
(45) Date of Patent: Sep. 29, 2009

(54) METERING HEAD FOR A SOWER

(75) Inventors: Ronnie D. Smith, Washington, NC (US); Douglas R. Woodward, Washington, NC (US)

(73) Assignee: Weyerhaeuser NR Company, Federal Way, WA (US)

( * ) Notice: Subject to any disclaimer, the term of this patent is extended or adjusted under 35 U.S.C. 154(b) by 310 days.

(21) Appl. No.: 11/291,052

(22) Filed: Nov. 29, 2005

(65) Prior Publication Data

US 2006/0130722 A1 Jun. 22, 2006

Related U.S. Application Data

(60) Provisional application No. 60/638,942, filed on Dec. 22, 2004.

(51) Int. Cl.
*A01C 7/00* (2006.01)
*A01C 9/00* (2006.01)

(52) U.S. Cl. ..................................................... 111/184

(58) Field of Classification Search ................. 111/170, 111/177–185, 171
See application file for complete search history.

(56) References Cited

U.S. PATENT DOCUMENTS

| 523,954 | A | 7/1894 | Baldwin |
| 3,636,897 | A | 1/1972 | Brink |
| 3,706,396 | A | 12/1972 | Knapp et al. |
| 3,855,953 | A | 12/1974 | Fathauer et al. |
| 3,888,387 | A | 6/1975 | Deckler |
| 3,912,121 | A | 10/1975 | Steffen |
| 3,912,122 | A | 10/1975 | Knapp et al. |
| 3,913,798 | A | 10/1975 | Allen |
| 4,026,437 | A * | 5/1977 | Biddle .......................... 406/70 |
| 4,027,606 | A | 6/1977 | Knapp |
| 4,029,028 | A | 6/1977 | Griffiths |
| 4,122,974 | A | 10/1978 | Harbert et al. |
| 4,254,897 | A | 3/1981 | Stocks |
| 4,254,898 | A | 3/1981 | Davis |
| 4,449,642 | A | 5/1984 | Dooley |
| 4,491,246 | A | 1/1985 | Dooley |
| 6,044,779 | A | 4/2000 | Brown et al. |
| 6,457,427 | B1 | 10/2002 | Moszoro et al. |
| 2002/0043201 | A1* | 4/2002 | Dunham ...................... 111/185 |
| 2003/0019409 | A1 | 1/2003 | Moszoro |

FOREIGN PATENT DOCUMENTS

| GB | 28290 | 0/1913 |
| GB | 926217 | 5/1963 |

* cited by examiner

*Primary Examiner*—Christopher J. Novosad
(74) *Attorney, Agent, or Firm*—Christensen O'Connor Johnson Kindness PLLC

(57) ABSTRACT

A metering head (20) for a sowing machine (22) is provided. The metering head includes a housing (40) and a metering disc (62) rotatably disposed within the housing. The metering disc includes a seed receptacle (78) substantially defining a perimeter of the metering disc and adapted to engage a seed (44) at any random position along the seed receptacle.

9 Claims, 5 Drawing Sheets

METERING HEAD FOR A SOWER

CROSS REFERENCE TO RELATED APPLICATION

The present application claims the benefit of U.S. Provisional Application No. 60/638,942, filed Dec. 22, 2004.

FIELD OF THE INVENTION

The presently described embodiments relate generally to sowing and planting machines and, more particularly, to a metering head for sowing and planting machines.

BACKGROUND OF THE INVENTION

Seed planters, often referred to as "sowing machines," are well known and are used to plant seeds of a wide variety of shapes and sizes. Such machines include a frame having a seed hopper holding a plurality of seeds to be planted. Typically, to control the spacing between planted seeds, sowing machines include a blade or furrow opener for digging a channel into which seeds are deposited by a metering head. After a seed is deposited into the furrow, a furrow closer and packing wheel follows to cover the seed.

Currently, a wide variety of metering heads are used to deposit seeds into a furrow. One such example is disclosed in U.S. Pat. No. 3,636,897, issued to Brink. Brink discloses a disc-shaped metering head having a plurality of individual pockets formed around its perimeter. The metering head is rotated into and out of communication with a seed hopper where seeds are deposited into each of the individual pockets. As the metering head continues to rotate, the seeds are dropped into a furrow formed by the sowing machine by gravity. A similar metering head is disclosed in U.S. Pat. No. 3,888,387, issued to Deckler. The metering head of Deckler also includes a plurality of equally spaced, seed receiving pockets about a periphery of the metering head. Such pockets are sized to receive at least one seed for planting by rotational movement of the metering head.

Another type of metering head is disclosed by U.S. Pat. No. 3,706,396, issued to Knapp et al. The metering head of Knapp et al. is a disc-shaped turret that includes a plurality of outwardly opening and vertically extending slots sized to receive a seed. The turret is rotatably mounted on a frame, such that as the turret is rotated, the slots are progressively moved into and out of an opening for planting in a furrow.

Thus, currently available metering heads include a plurality of individual pockets or slots formed around a perimeter of a disc-shaped wheel, wherein each individual pocket is sized to receive at least one seed. Although such metering heads are effective for sowing machines, they are not without their problems. As an example, because the metering head includes a plurality of individual, non-continuous pockets formed around a perimeter, the sowing apparatus must include some timing mechanism to deposit seeds within each individual pocket or such individual pockets will lack a seed for planting. This results in the undesirable effect of having too much space between seed plantings. As a result, there exists a need for an improved metering head for sowing apparatuses.

SUMMARY OF THE INVENTION

In accordance with one embodiment of the present invention, a metering head for a sowing machine is provided. The metering head includes a housing and a metering disc rotatably disposed within the housing. The metering disc includes a seed receptacle substantially defining a perimeter of the metering disc. The metering disc is adapted to engage a seed at any random position along the seed receptacle.

A metering head for a sowing machine formed in accordance with another embodiment of the present invention includes a housing and first and second metering discs disposed within the housing. Each of the first and second metering discs include a seed engagement surface substantially continuously formed around a perimeter of the first and second metering discs to randomly engage a seed.

A metering head for a sowing machine constructed in accordance with yet another embodiment of the present invention includes a housing having at least a first channel extending between an inlet port and an outlet port. The inlet port is in communication with a seed hopper for receiving a seed. The metering head also includes a first metering disc having a perimeter and positioned within the housing to be in communication with the first channel. The first metering disc includes a seed engagement surface substantially formed around its perimeter and is positioned to engage the seed and any random position on the seed engagement surface.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION OF THE PREFERRED EMBODIMENT

Figure 1:
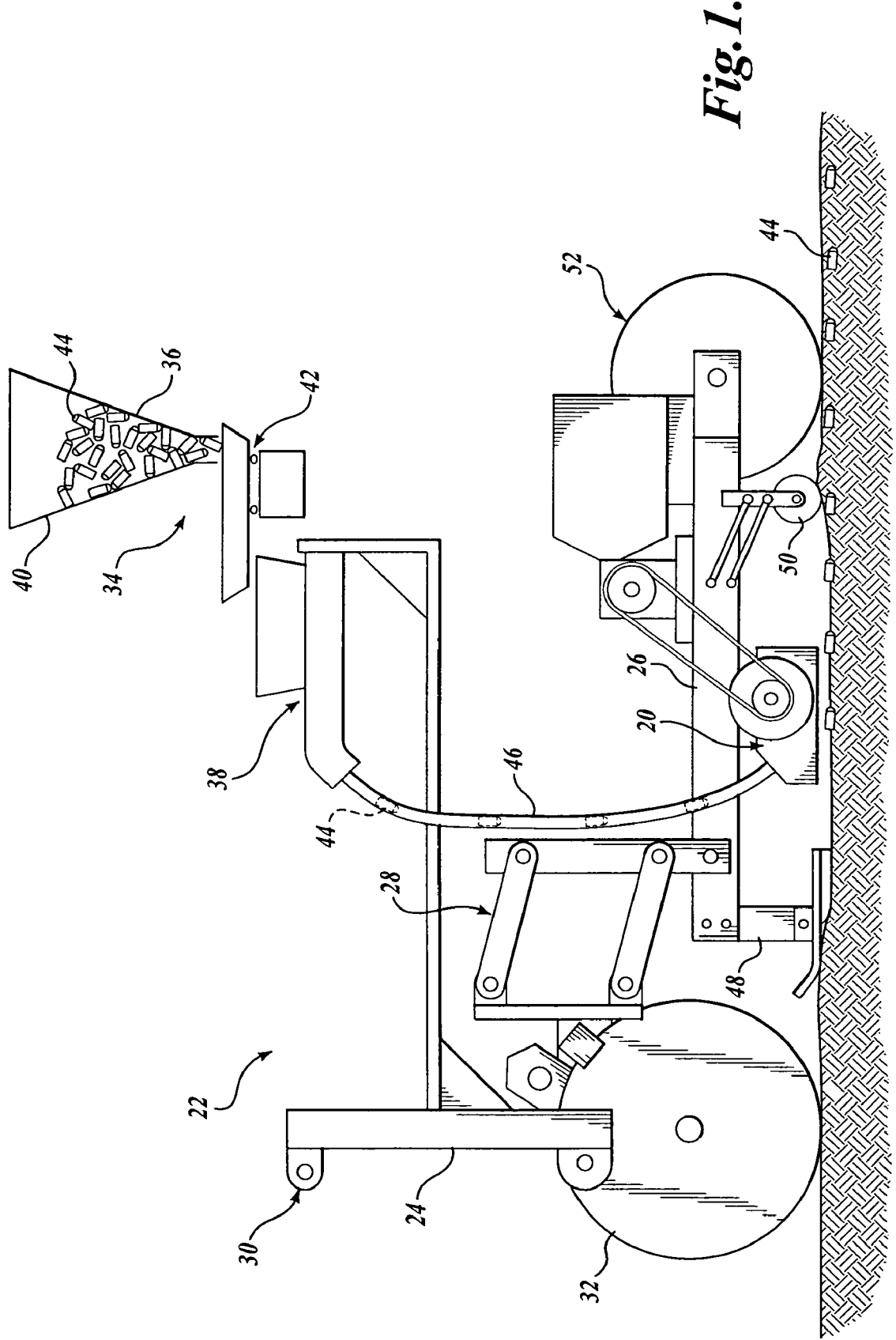
FIG. 1 is a side, planar view of a sowing machine having a metering head formed in accordance with one embodiment of the present invention.

Referring to FIG. 1, a metering head 20 constructed in accordance with one embodiment of the present invention is illustrated as it would be used with a sowing machine 22. The well-known sowing machine 22 includes a frame 24 connected to a sled 26 by a linkage bar mechanism 28. The frame 24 includes a mount 30 adapted to the hook to a motorized vehicle (not shown), such as a tractor, and an encoder wheel 32. The well-known encoder wheel 32 measures ground speed as the sowing machine 22 traverses a surface, such as a field.

The frame 24 also includes a seed dispenser assembly 34. The seed dispenser assembly 34 includes a seed hopper 36 and a seed singulator and orientation assembly 38. The seed hopper 36 includes an inverted cone-shaped housing 40 in communication with a vibratory feeder 42. The housing 40 is adapted to receive a plurality of seeds 44 that are in turn dispensed downwardly into the vibratory feeder 42. One end of the vibratory feeder 42 is positioned adjacent the seed singulator and orientation assembly 38.

The well-known seed singulator and orientation assembly 38 is adapted to separate a plurality of seeds 44 dispensed into the seed singulator and orientation assembly 38 in any manner well-known to one of ordinary skill in the art. Examples of such seed singulator and orientation assemblies are disclosed in U.S. Pat. No. 3,912,122 issued to Knapp et al., and U.S. Pat. No. 4,027,606 issued to Knapp, the disclosures of which are hereby expressly incorporated by reference. The seed singulator and orientation assembly 38 separates seeds 44 that are clustered or clumped together and positions each seed 44 for transport to the metering head 20 by a seed transport tube 46.

Still referring to FIG. 1, the linkage bar mechanism 28 couples the sled 26 to the frame 24 and permits vertical displacement of the sled 26 relative to the frame 24 to accommodate changes in terrain. The sled 26 includes a furrow opener 48, a furrow closer 50, and a packing wheel 52. The furrow opener 48 is positioned in a forward end of the sled 26 and is positioned to dig a trench into which the seeds 44 are dispensed by the metering head 20. Located aft of the metering head 20 is the furrow closer 50, which is trailed by the packing wheel 52.

Figure 2:
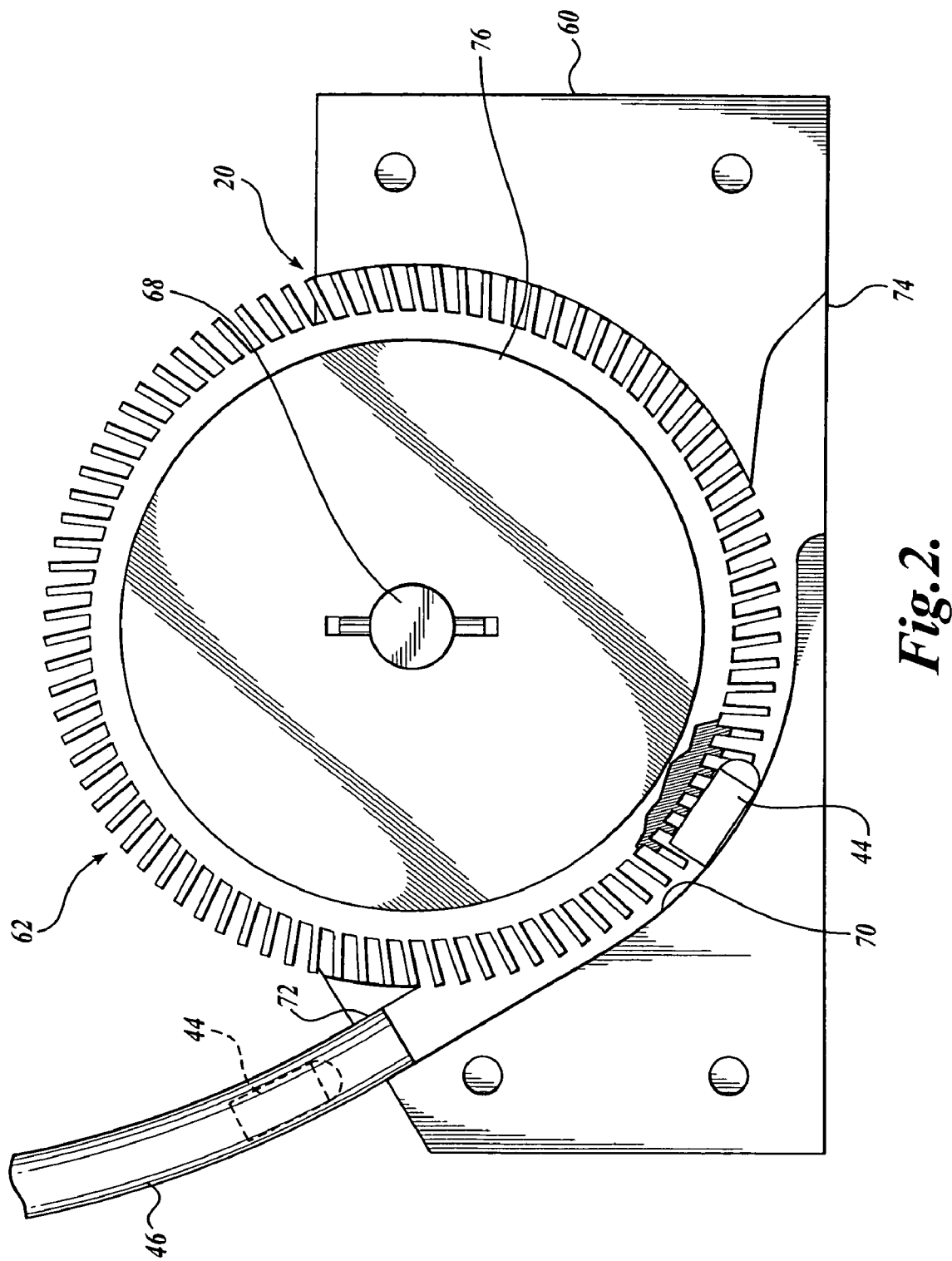
FIG. 2 is a side, planar view of the metering head of FIG. 1 with a portion of the metering head housing removed for clarity and showing a metering disc.
Figure 3:
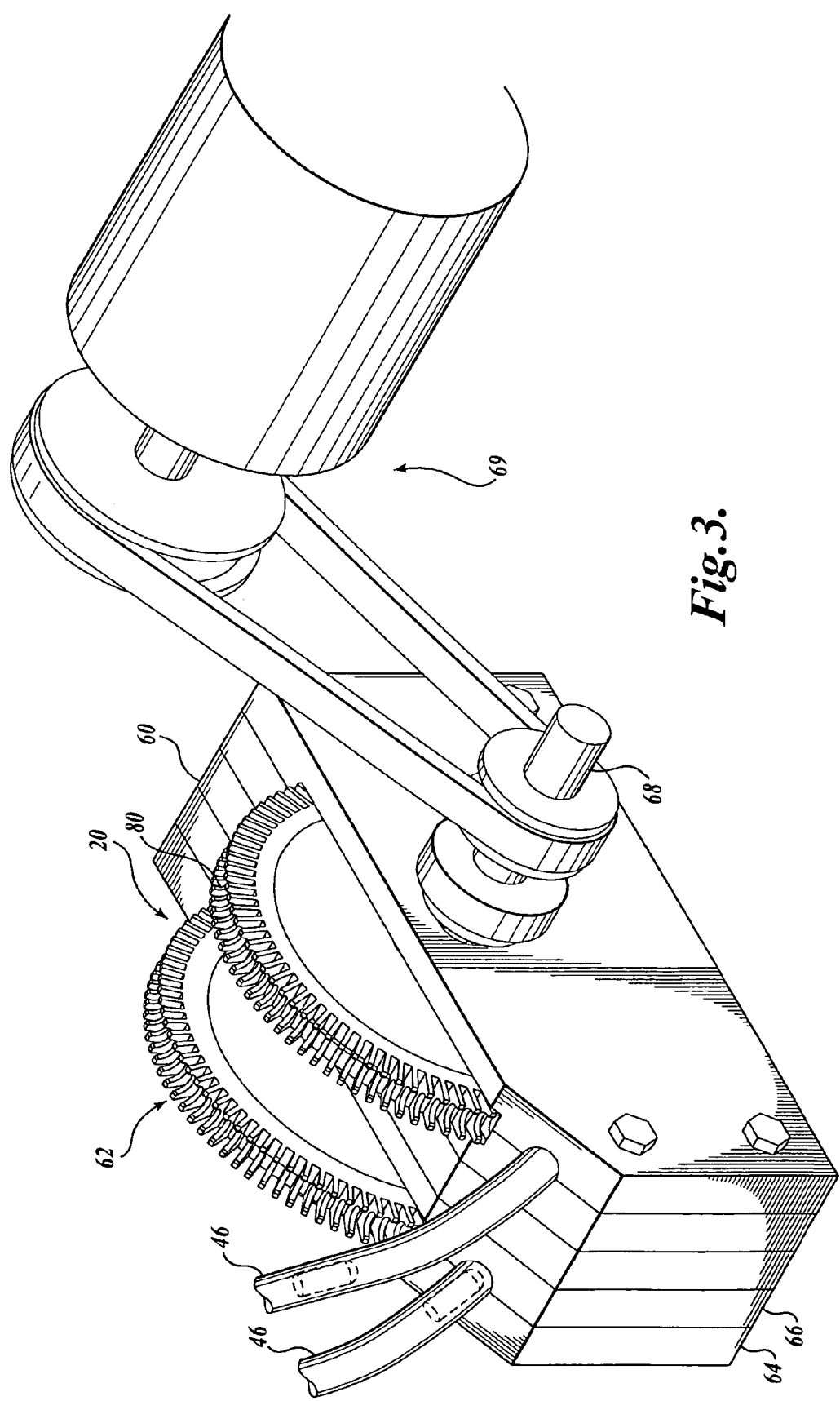
FIG. 3 is an isometric view of the metering head of FIG. 1, showing two metering heads connected together and also showing a concave perimeter of a metering disc and a metering head drive assembly.
Figure 4:
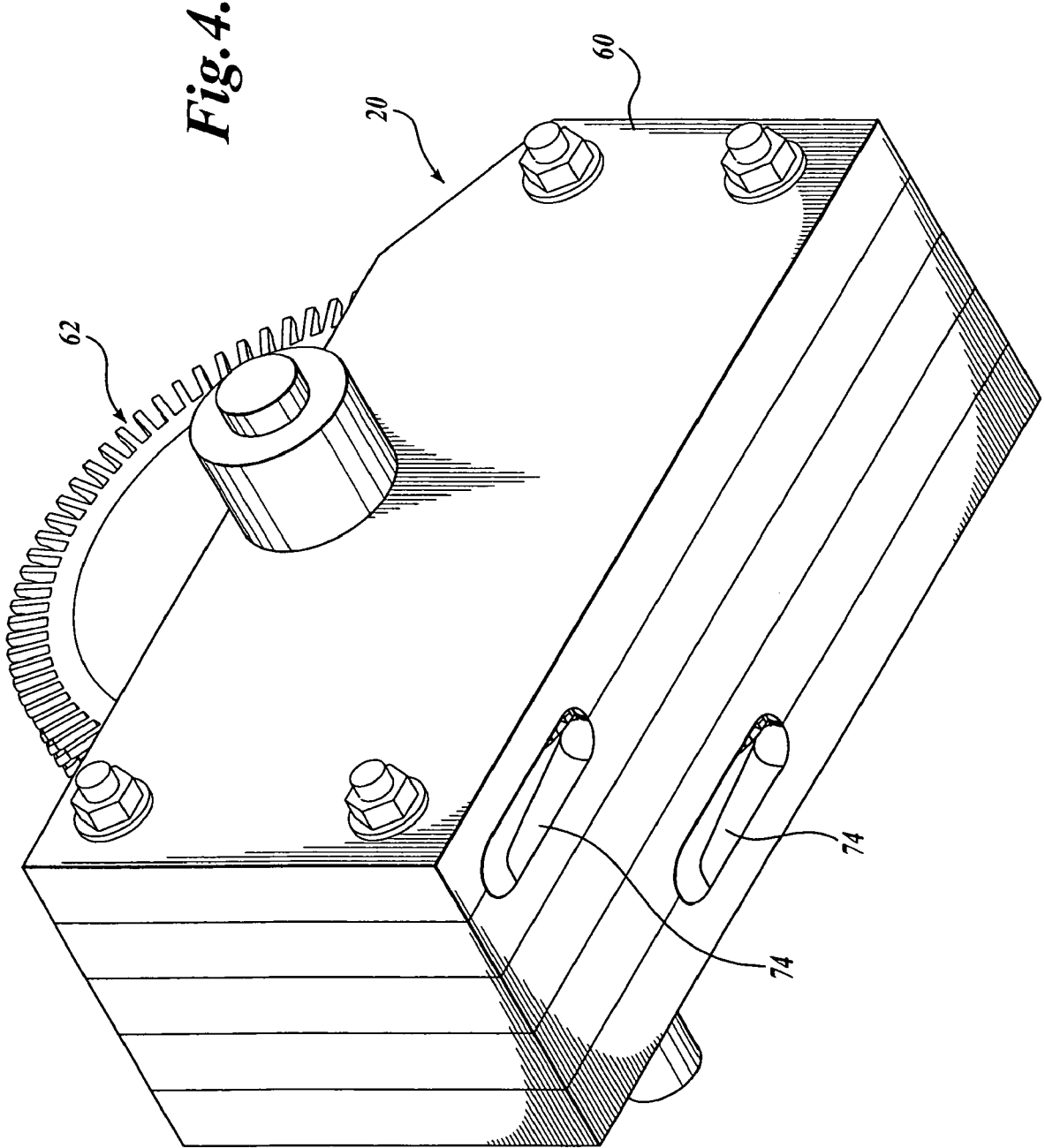
FIG. 4 is a substantially bottom, isometric view of the metering head of FIG. 1, showing two staggered seed outlet ports.

Referring now to FIGS. 2-4, the metering head 20 will now be described in greater detail. The metering head 20 includes a housing 60 and a metering disc 62. The metering disc 62 is suitably sandwiched between first and second housing sections 64 and 66 and is rotatably disposed therein on an axle 68. The axle 68 is driven by a well-known drive motor and pulley assembly 69.

The first and second housing sections 64 and 66 are suitably formed from any durable material, such as nylon. A housing channel 70 is formed within each of the first and second housing sections 64 and 66 and extends between an inlet port 72 and an outlet port 74. The inlet port 72 is formed in an upper surface of the housing 60 and the outlet port 74 is suitably formed in a lower surface of the housing 60. The inlet port 72 is sized to receive the one end of the seed transport tube 46 therein. As seen best by referring to FIGS. 3 and 4, two or more housings 60 may be pinned together to form a metering head having multiple metering discs. In such an assembly, it is preferable that the outlet ports 74 be staggered, as illustrated in FIG. 4, to further enhance the spacing between seeds 44 deposited by the metering head 20 during use.

As may be best seen by referring back to FIGS. 2 and 3, the metering disc 62 includes a baseplate 76 and a seed engagement surface 78. The seed engagement surface 78 may also be referred to as a seed receptacle.

The baseplate 76 is suitably manufactured from a high-strength material, such as aluminum, and the seed engagement surface 78 is a molded urethane. The seed engagement surface 78 is attached to the perimeter of the baseplate 76 such that it substantially defines the perimeter of the metering disc 62. Within the meaning of this disclosure, the term "substantially" means that the seed engagement surface 78 may be partitioned into two or more pieces. Thus, a seed engagement surface comprising a single or multiple parts is within the scope and meaning of the present invention.

As may be best seen by referring to FIG. 3, the perimeter of the seed engagement surface 78 includes a channel 80. The channel 80 is geometrically configured to engage a seed 44 to assist in passing the seed 44 through the housing channel 70. The channel 80 forms a substantially continuous surface around the perimeter of the metering disc 62 to allow random engagement along any portion of the channel 80 with the seed 44 during operation of the metering head 20.

Operation of the metering head 20 may be best understood by referring to FIGS. 1-4. In that regard, a seed 44 stored in the seed hopper 36 is deposited into the vibratory feeder 42 where it is eventually deposited into the seed singulator and orientation assembly 38. The seed singulator and orientation assembly 38 transports seeds 44 to the metering head 20 by passing the seeds 44 through the seed transport tube 46. Each seed 44 passes into the housing channel 70 through the inlet port 72 where it engages the seed engagement surface 78 of the metering disc 62.

The seed 44 contacts the seed engagement surface 78 such that it is within the channel 80. In this arrangement, the seed 44 randomly contacts any portion of the seed engagement surface 78. As contacted with the seed engagement surface 78, the seed 44 passes through the housing channel 70 until it reaches the outlet port 74. As the seed 44 reaches the outlet port 74, it falls out of the metering head 20 and into a furrow created by the furrow opener 48. If the metering head 20 includes multiple metering discs 62 (FIGS. 3 and 4), multiple seeds 44 are deposited into adjacent rows. Thereafter, the furrow closer 50 and packing wheel 52 seals the seeds 44 within soil.

Figure 5:
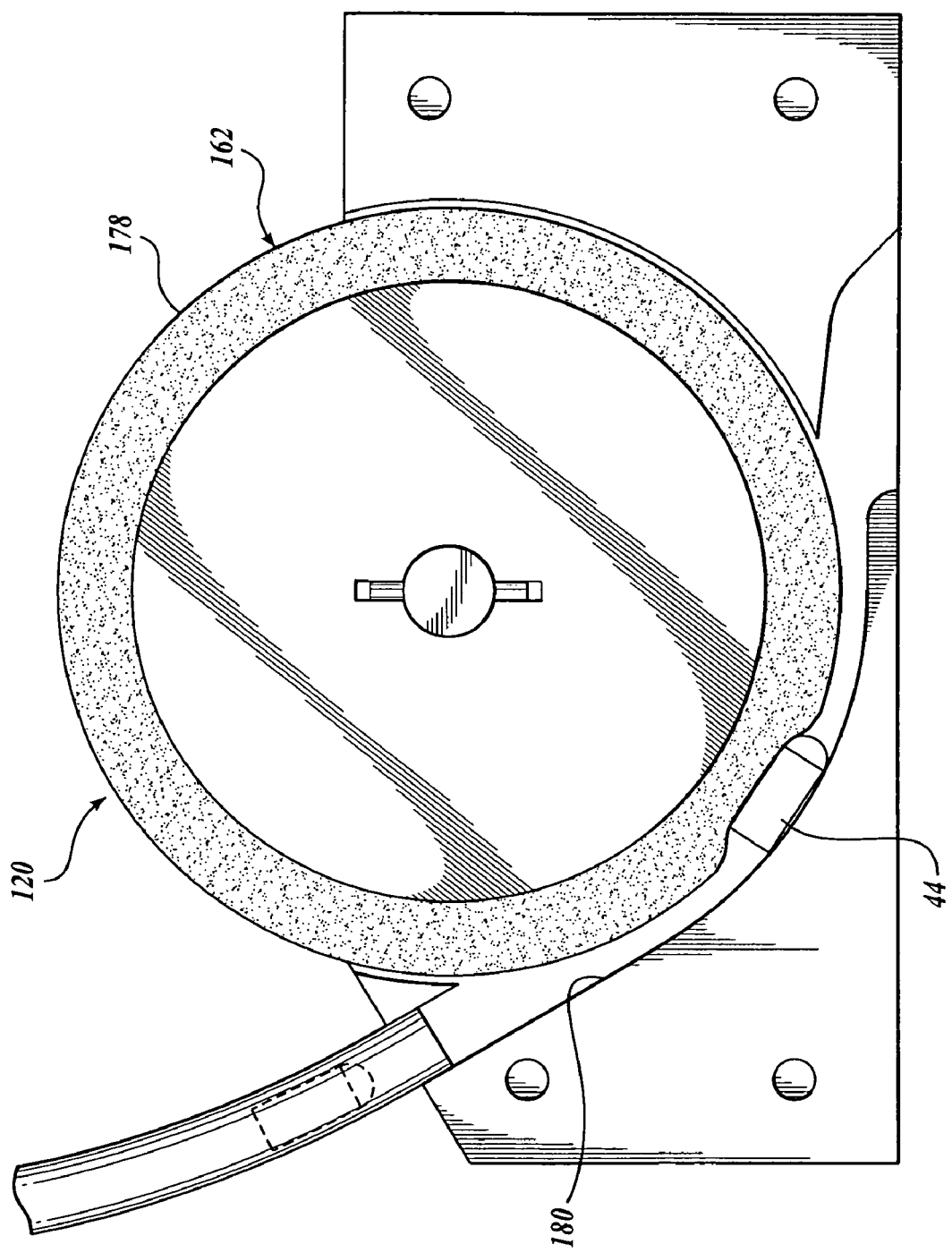
FIG. 5 is a side, planar view of a metering head constructed in accordance with another embodiment of the present invention with a portion of the metering housing removed for clarity and showing a metering disc.

Referring now to FIG. 5, a metering head 120 formed in accordance with another embodiment of the present invention will now be described in greater detail. The metering head 120 is substantially identical in materials and operation as the metering head 20 described above, with the exception that the metering disc 162 includes a seed engagement surface 178 made from a foam. In this embodiment, the seed engagement surface 178 is compressed by pinching of the seed 44 between the walls of the channel 180 and the perimeter of the seed engagement surface 178. The metering disc 162 passes the seed 44 through the channel 180 for planting in the soil, as described above. Further, a plurality of metering heads 120 may be fastened together to form a metering head having a plurality of metering discs 162.

While the preferred embodiment of the invention has been illustrated and described, it will be appreciated that various changes can be made therein without departing from the spirit and scope of the invention. As a non-limiting example, it is not necessary for the metering disc 62 to include a channel 80. As such, metering discs 62 without a channel are also within the scope of the present invention.

The embodiments of the invention in which an exclusive property or privilege is claimed are defined as follows:

1. A metering head for a sowing machine having a seed hopper, a furrow opener and a furrow closer, the metering head comprising:

(a) a housing; and (b) a metering disc rotatably disposed within the housing, the metering disc having a seed receptacle substantially defining a perimeter of the metering disc, wherein the seed receptacle forms a substantially continuous surface around the perimeter of the metering disc to define a channel extending between the perimeter of the metering disc and a portion of the housing, the seed receptacle adapted to engage a seed at any random position along the seed receptacle and transport the seed between an inlet port and an outlet port.

2. The metering head of claim 1, wherein the seed receptacle is geometrically configured to engage the seed.

3. The metering head of claim 1, wherein the seed receptacle is concave to engage the seed.

4. The metering head of claim 1, wherein the channel extends through the housing between the inlet port and the outlet port.

5. The metering head of claim 4, further comprising at least a second channel extending through the housing and in communication with the metering disc.

6. The metering head of claim 4, wherein the channel is in communication with the metering disc for passing a seed through the metering head.

7. The metering head of claim 6, wherein the seed receptacle engages at least a portion of the seed as the seed passes through the channel.

8. The metering head of claim 6, wherein the seed receptacle is manufactured from urethane.

9. The metering head of claim 6, wherein the seed receptacle is manufactured from foam.

\* \* \* \* \*